United States Patent [19]

Fushiya et al.

[11] Patent Number: 4,805,504

[45] Date of Patent: Feb. 21, 1989

[54] SAFETY COVER FOR MITER SAW

[75] Inventors: Fusao Fushiya; Nobuhiro Inoue; Kazunori Tsuge, all of Anjo, Japan

[73] Assignee: Makita Electric Works, Ltd., Anjo, Japan

[21] Appl. No.: 137,668

[22] Filed: Dec. 24, 1987

[30] Foreign Application Priority Data

Dec. 29, 1986 [JP] Japan ................................ 61-312440

[51] Int. Cl.[4] ......................... B23D 45/14; B27B 5/18

[52] U.S. Cl. ......................................... 83/397; 83/478; 83/490

[58] Field of Search ......................... 83/397, 478, 490; 51/268

[56] References Cited

U.S. PATENT DOCUMENTS 3,821,918 7/1974 Niehaus et al. .................... 83/478 X
4,028,975 6/1977 Bennett .............................. 83/478 X
4,343,213 8/1982 Drixler .................................. 83/397
4,581,966 4/1986 Kaiser et al. .......................... 83/397

*Primary Examiner*—Frank T. Yost
*Assistant Examiner*—Rinaldi Rada
*Attorney, Agent, or Firm*—Dennison, Meserole, Pollack & Scheiner

[57] ABSTRACT

A power miter saw includes a support base and a mounting arm connected to the support base for swinging movement around a vertical axis. A miter saw unit is pivotally connected to the mounting arm. The miter saw unit includes a circular saw blade and a drive motor for driving the saw blade. A blade case is attached to the miter saw unit and is adapted to partially encase the saw blade so as to provide an exposed operational portion of the saw blade. A movable safety cover is mounted on the blade case so as to cover the exposed operational portion of the saw blade. Actuating means is disposed between the mounting arm and the safety cover for directly associating the safety cover with the pivotal movement of the miter saw unit.

3 Claims, 4 Drawing Sheets

SAFETY COVER FOR MITER SAW

BACKGROUND OF THE INVENTION

1. Field of the Invention

The present invention relates to power miter saws, and more particularly to a safety cover for such miter saws which may cover the saw blade as fully as possible even during operation.

2. Description of the Prior Art

Such miter saws may include a miter saw unit pivotally connected to a support base for pivotal movement between a raised rest position and a lowered operational position. The saw unit includes an electric motor which rotatably drives a circular saw blade; and a blade case which partially encases the saw blade. For safety reasons, a safety cover is pivotally mounted on the blade case for covering the saw blade. The safety cover is mounted in a manner such that it will be swung clear of the saw blade upon its engagement with a workpiece when the saw unit is lowered to its operational position. Typical prior art devices of this general type are disclosed by U.S. Pat. Nos. 3,821,918 and 3,994,192.

In such prior art saws, however, the safety cover is swung upon its engagement with the workpiece when the saw is pivoted from its rest position to its operational position. In other words, the safety cover is pivoted indirectly through the workpiece, so that the movement of the safety cover is inconstant depending on the condition of the workpiece, thus lacking in smoothness and reliability. Especially, during angular cutting operation, a cut-off portion or chip of the workpiece, being unfixed or free on the support base, can often engage the safety cover, causing the latter to turn upwardly to expose a portion of the saw blade. Furthermore, as the safety cover is simply spring biased for pivotal movement relative to the blade case, it can be manually pivoted by the operator even in a normal operating condition. This is disadvantageous from the standpoint of safety.

SUMMARY OF THE INVENTION

It is, accordingly, an object of the present invention to eliminate the noted disadvantages of the prior art miter saws.

It is another object of the present invention to provide a safety cover for a power miter saw which is initially pivoted directly by pivotal movement of the miter saw unit, irrespective of presence of a workpiece, so that the safety cover is moved both smoothly and reliably.

It is a further object of the present invention to provide a safety cover for a power miter saw which assures fully covered condition of the saw blade at all times when the miter saw is not in use.

The power miter saw includes, according to the present invention, a support base and a mounting arm connected to the support base for swinging movement around a vertical axis. A miter saw unit is pivotally connected to the mounting arm. The miter saw unit includes a circular saw blade and a drive motor for driving the saw blade. A blade case is attached to the miter saw unit and is adapted to partially encase the saw blade so as to provide an exposed operational portion of the saw blade. A movable safety cover is mounted on the blade case so as to cover the exposed operational portion of the saw blade. Actuating means is disposed between the mounting arm and the safety cover for directly associating the safety cover with the pivotal movement of the miter saw unit.

The present invention will become more fully apparent from the claims and description as it proceeds in connection with the drawings.

DETAILED DESCRIPTION OF THE PREFERRED EMBODIMENT

Figure 1:
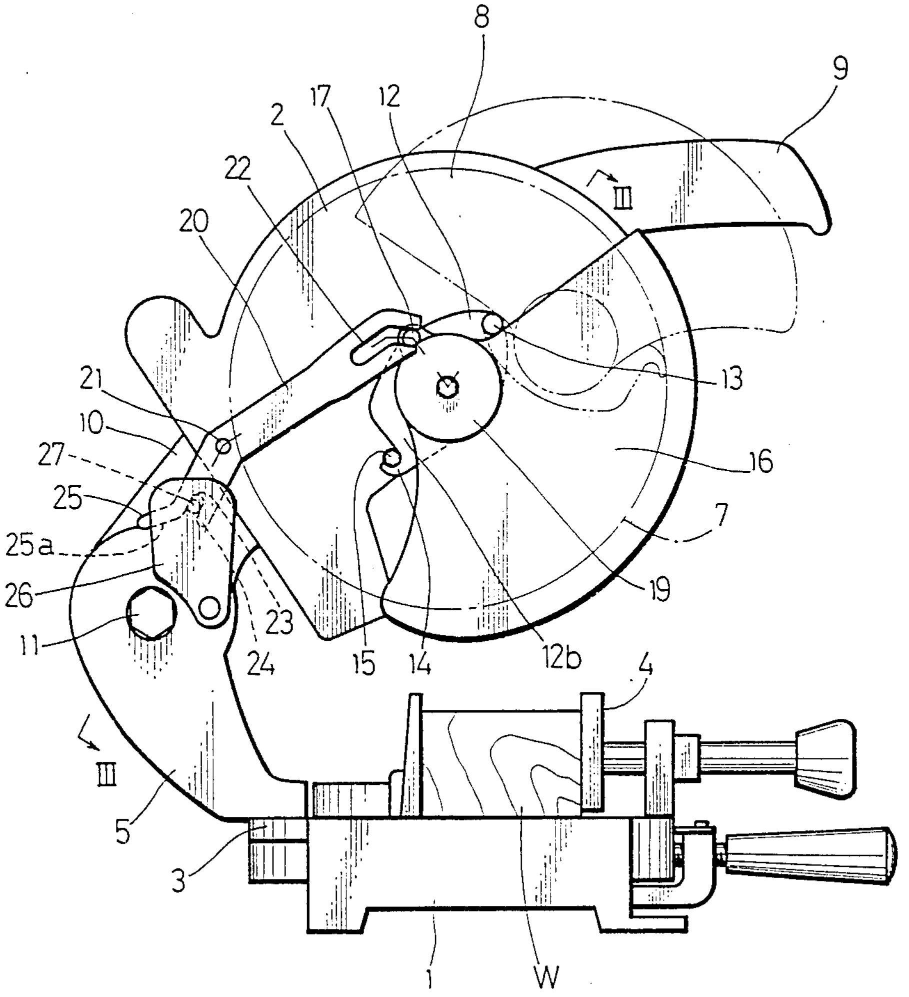
FIG. 1 is a side view of a power miter saw embodying the present invention.

Referring to the drawings and to FIG. 1 in particular, shown therein is a power miter saw constructed in accordance with the present invention. As shown therein, the miter saw includes a support base 1 and a miter saw unit 2. The support base 1 includes a rotatably mounted turntable 3 and a clamp 4 for clamping a workpiece W. A mounting arm 5 is fixedly connected to the rear end of the turntable 3 for swinging movement around a vertical axis.

Figure 2:
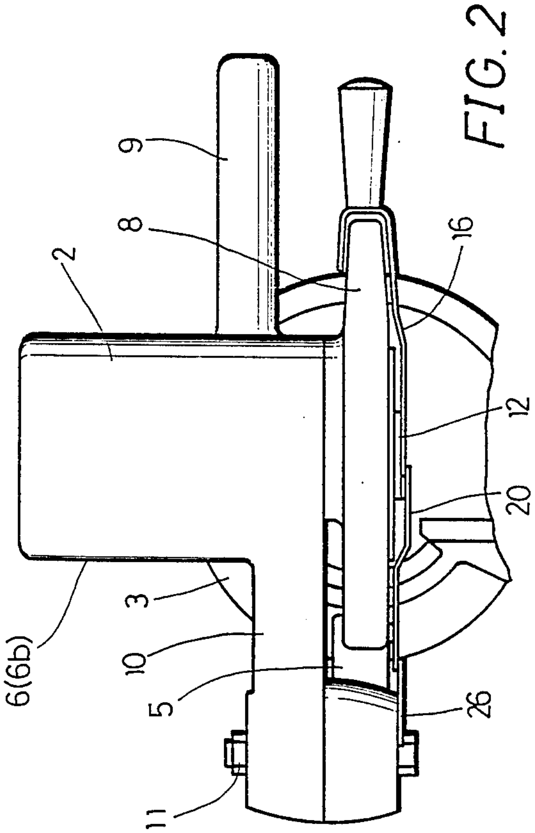
FIG. 2 is a plan view of the miter saw shown in FIG. 1.
Figure 3:
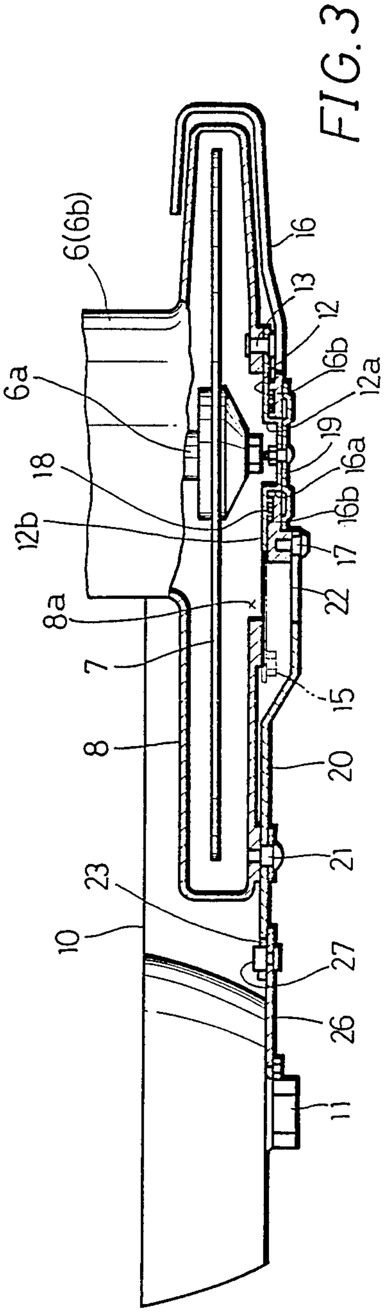
FIG. 3 is an enlarged sectional view taken in the direction of the arrows substantially on line III—III of FIG. 1.

As may be seen in FIGS. 2 and 3, the miter saw unit 2 is mainly comprised of a drive motor 6 having a shaft 6*a* and a housing 6*b*; a circular saw blade 7 mounted on the motor shaft 6*a* and a blade case 8 attached to the motor housing 6*b* and adapted to cover substantially half the saw blade 7. The motor housing 6*b* has integrally formed a control handle 9 which projects from one side thereof and a support arm 10 which projects from the other side thereof in opposed relation to the handle 9. The support arm 10 is pivotally supported generally on the upper end of the mounting arm 5 through a support shaft 11 (FIG. 1) and therefore, the miter saw unit 2 is pivotally mounted on the support base 1, between a raised rest position and a lowered operational position. The miter saw unit 2 may be manually moved toward the support base 1 through the handle 9, and it may be positively returned under the biasing force of a return spring (not shown) resiliently mounted on the support shaft 11 between the support arm 10 and the mounting arm 5. The extent of the swinging return movement of the miter saw unit 2 is restricted by a stopper (not shown) substantially to the position shown in FIG. 1.

The blade case 8 has a cutout portion 8*a* formed generally in opposed relation to the central mounting portion of the saw blade 7 (FIG. 3). A mounting cap 12 is provided generally in opposed relation to the cutout portion 8*a* and is adapted to mount a safety cover which will be described later. Specifically, the mounting cap 12 has a large diameter boss portion 12*a* in alignment with the central mounting portion of the saw blade 7 and a substantially elliptical flange portion 12*b* extending outwardly from the boss portion 12*a* (FIG. 1). The flange portion 12*b* is pivotally supported at one end to the blade case 8 through a support pin 13. The other end of the flange portion 12*b* forms a hooked engaging portion 14 which is releasably fastened to the blade case 8 by a locking bolt 15.

A substantially sectorial safety cover 16 is provided and is adapted to cover a portion of the saw blade 7 exposed from the blade case 8. Specifically, as shown in FIG. 3, the safety cover 16 has a central mounting hole 16*a* in which the boss portion 12*b* of the mounting cap 12 is received, so that the safety cover 16 is mounted on the mounting cap 12 in a pivotable manner. The safety cover 16 also has adjacent the central mounting hole 16*a* a flange portion 16*b* from which a first engaging pin 17 is projected at a location intermediate between the support pin 13 of the mounting cap 12 and the locking bolt 15 of the engaging portion 14. A spiral spring 18 is resiliently positioned between the flange portion 12*b* of the mounting cap 12 and the flange portion 16*b* of the safety cover 16 and is adapted to impart biasing force to the safety cover 16 to cause swinging return movement thereof. A retaining disc plate 19 is fastened by a screw to the boss portion 12*a* of the mounting cap 12 so as to prevent the safety cover 16 from falling out of the boss portion 12*a* of the mounting cap 12.

An actuating link 20 of crooked configuration is pivotally connected at the bent portion thereof to one side of the blade case 8 through a support pin 21. Specifically, as shown in FIG. 1, the actuating link 20 has one end located in opposed relation to the safety cover 16 and the other end located in opposed relation to the mounting arm 5. The one end in opposed relation to the safety cover 16 is forked to define a first cam groove 22 of crooked configuration, and the first engaging pin 17 is movably fitted in the first cam groove 22. The other end in opposed relation to the mounting arm 5 also is forked to define a second cam groove 23 of substantially U-shaped configuration and has, across the cam groove 23, one leg forming a stopper piece 24 and the other leg forming a cam piece 25 of substantially L-shaped configuration. A mounting plate 26 is secured to one side of the mounting arm 5 and has a second engaging pin 27 projecting from the upper end thereof and engageable with the second cam groove 23. When moved out of the second cam groove 23, the second engaging pin 27 may be brought in abutting engagement with a cam face 25*a* of the cam piece 25.

When the actuating link 20 thus constructed is in the position shown in FIG. 1 prior to swinging movement of the miter saw unit 2, the first engaging pin 17 is located in the first cam groove 22 at the one end adjacent the entrance thereof, and the second engaging pin 27 is located in the second cam groove 23 at the other end. Engagement of the second engaging pin 27 with the stopper piece 24 restricts the biasing force of the spiral spring 18 for pivotally returning the safety cover 16, so that the portion of the saw blade 7 exposed from the blade case 8 may be kept covered by the safety cover 16. Thus, should a counterclockwise force be applied to the safety cover 16, for example, by the operator, the safety cover 16 will not expose the saw blade 7, so long as the second engaging pin 27 is in engagement with the stopper piece 24.

Figure 4:
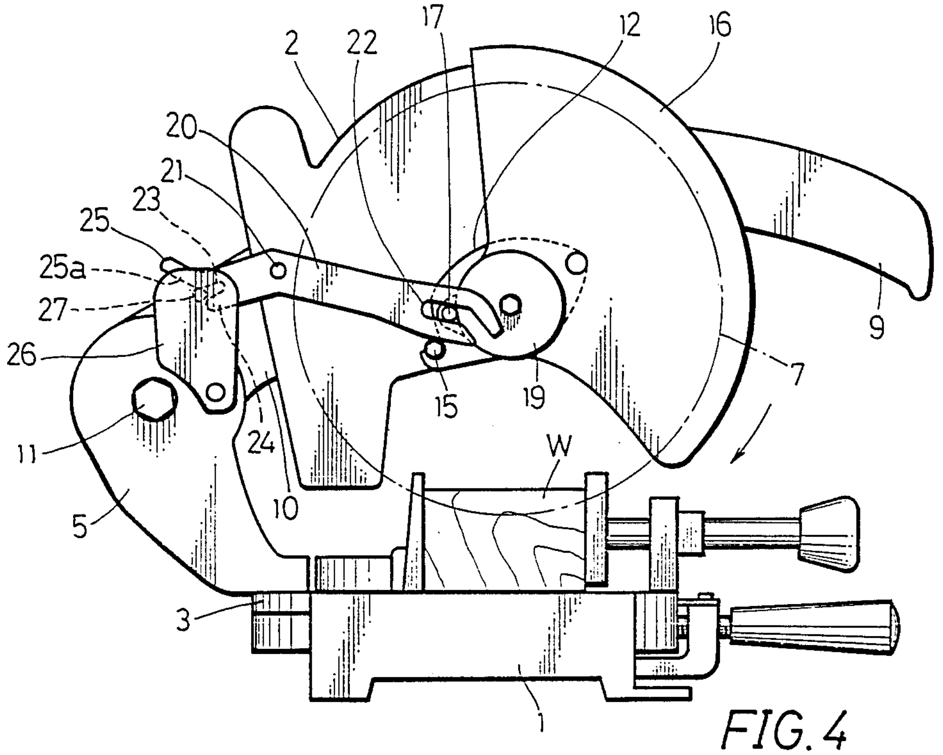
FIGS. 4 and 5 are side views illustrating various phases of operation through the miter saw.
Figure 5:
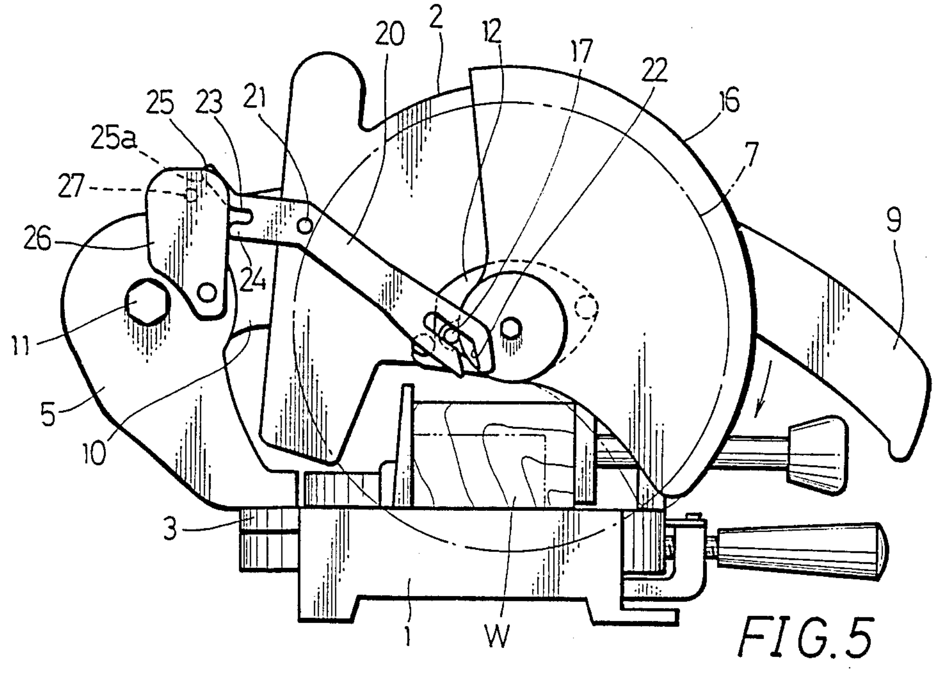

The operation of the miter saw thus constructed will now be described with reference to FIGS. 4, 5 and 6.

Assuming that a workpiece W is properly clamped by the clamp 4 on the support base 1, the drive motor 6 is driven to rotate the blade saw 7. As the operator moves the miter saw unit 2 toward the support base 1 by pushing downwardly on the handle 9, the saw unit 2 is pivoted around the support shaft 11 along a vertical path relative to the support base 1. This swinging movement of the saw unit 2 causes a downward movement of the support pin 21 of the actuating link 20 around the support shaft 11. At this time, however, the movement of the other end of the actuating link 20 is restricted as the second engaging pin 27 engages the second cam groove 23 and abuts on the cam face 25*a* of the cam piece 25. Thus, the actuating link 20 is pivoted clockwise around the support pin 21, independently of the swinging movement of the saw unit 2. This clockwise movement of the actuating link 20 causes the first engaging pin 17 to be moved from the position adjacent the entrance of the first cam groove 22 to an inner position along the crooked configuration. The safety cover 16 is then positively pivoted counterclockwise around the boss portion 12*a* of the mounting cap 12 against the biasing force of the spring 18, so that a portion of the circular saw blade 7 may be exposed to the workpiece W (FIGS. 4 and 6).

Figure 6:
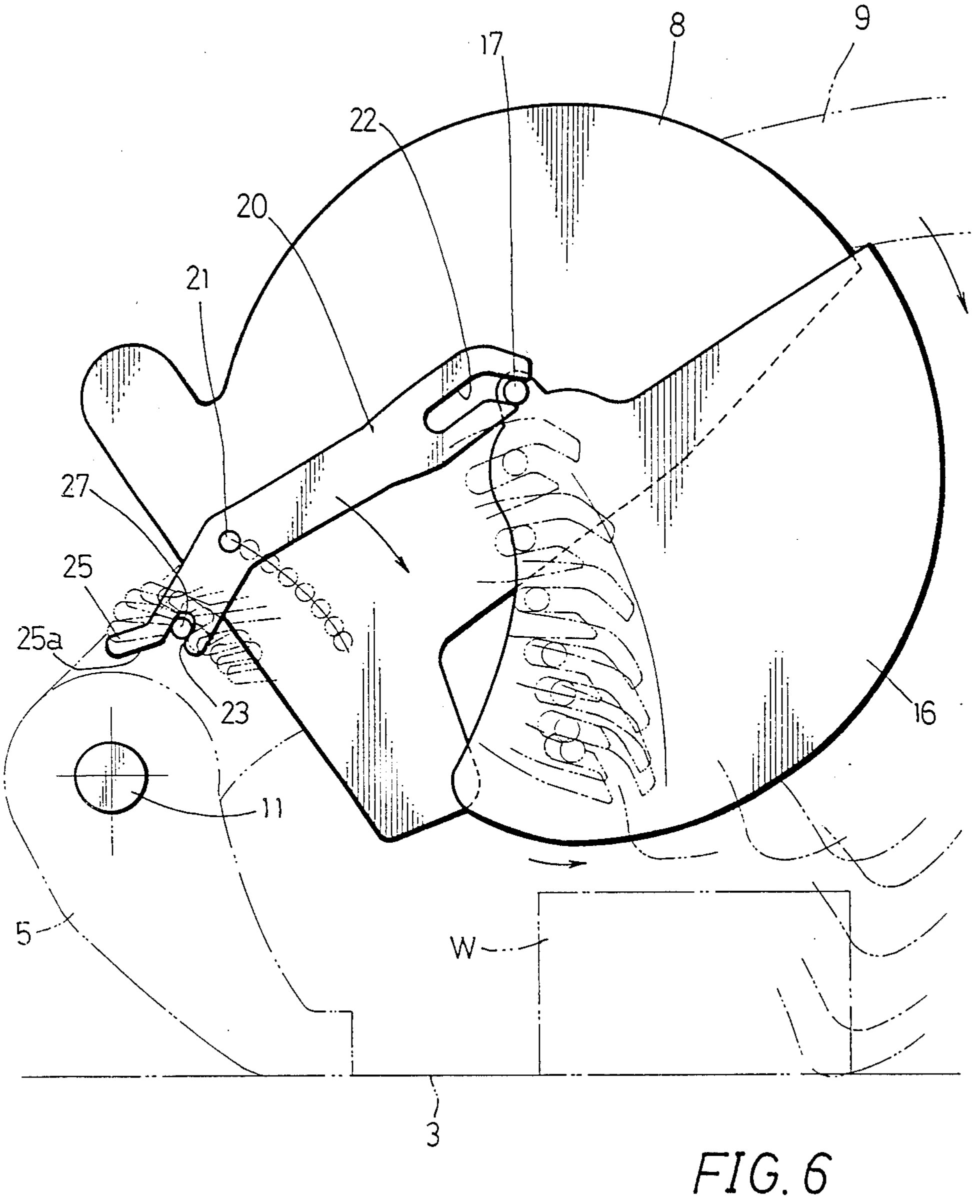
FIG. 6 is a schematic view illustrating various operational positions of the actuating link and the safety cover.

This condition is maintained, as long as the second engaging pin 27 is in abutting engagement with the cam face 25*a* of the cam piece 25, and, as described above, the safety cover 16 is positively pivoted counterclockwise so as to increase the exposed portion of the circular saw blade 7 (FIG. 6).

When the saw unit 2 is further moved downwardly, a portion of the safety cover 16 pivoted as described above engages a portion (upper corner) of the workpiece W, and as the saw unit 2 is furthermore moved, the safety cover 16 is independently pivoted counterclockwise around the boss portion 12*b* of the mounting cap 12, irrespective of rotation of the actuating link 20, because of the engagement of the safety cover 16 with the workpiece W. In this condition, as the safety cover 16 is pivoted, the first engaging pin 17 is pivotally displaced, imparting rotational force to the one end of the actuating link 20, and consequently, the actuating link 20 is further pivoted clockwise, so that the abutting engagement between the cam face 25*a* of the cam piece 25 and the second engaging pin 27 may be released. As the result, since the safety cover 16 is now under the returning rotational force in the clockwise direction produced by the biasing force of the spring 18, the engagement of the safety cover 16 with the workpiece W is maintained (FIGS. 5 and 6).

The above condition is maintained during further swinging movement of the saw unit 2 to perform a cutting operation. When the safety cover 16 does not engage the workpiece W (for example, when the size of the workpiece is small as shown by a phantom line in FIG. 5), the abutting engagement between the cam face 25*a* of the cam piece 25 and the second engaging pin 27 is maintained, so that the swinging movement of the saw unit 2 causes clockwise movement of the actuating link 20 around the support pin 21 and hence, positive pivotal movement of the safety cover 16 in the counterclockwise direction. The safety cover 16 is then lowered until it engages the turntable 3, and this condition is maintained, as with the above condition in which the safety cover 16 engages the workpiece W (FIGS. 5 and 6).

As the cutting operation for the workpiece W is completed and the saw unit 2 is released from its swinging movement, the saw unit 2 is pivotally returned to its original position. As this occurs, the safety cover 16 is gradually pivoted to its original position under the biasing force of the spring 18 so as to cover the exposed portion of the saw blade 7, and the actuating link 20 is returned to its original position by reversing the process described above.

In this embodiment, when it is desired to change the saw blade 7, the locking bolt 15 is released to turn the mounting cap 12 along with the safety cover 16 around the support pin 13, as shown by a phantom line in FIG. 1, so that the opening of the blade case 8 may be widely exposed to facilitate changing of the saw blade 7.

From the foregoing detailed description of the power miter saw, it can be appreciated that the safety cover 16 may be positively rotated by the actuating link 20 as the miter saw unit 2 is lowered toward the support base 1 and hence, a miter cutting operation may be performed both easily and safely. Also, it can be seen that while the saw unit 2 is in its raised rest position, the safety cover 16 may be effectively prevented from rotation as it is associated with the actuating link 20 which is locked when the saw unit 2 is in its rest position.

While the invention has been described with reference to a preferred embodiment thereof, it is to be understood that modifications or variations may be easily made without departing from the scope of the present invention which is defined by the appended claims.

What is claimed is:

1. A power miter saw comprising:

a support base;

a mounting arm connected to said support base for swinging movement around a vertical axis;

a miter saw unit pivotally connected to said mounting arm for movement between a rest position and an operational position, said saw unit having a circular saw blade and a drive motor for driving said saw blade;

a blade case attached to said miter saw unit and adapted to partially encase said saw blade so as to provide an exposed operational portion of said saw blade;

a movable safety cover mounted on said blade case and adapted to cover said exposed operational portion of said new blade; and actuating means disposed between said mounting arm and said safety cover, associating said safety cover with the pivotal movement of said miter saw unit, for fixing said safety cover to said saw unit for limited movement of said cover to partially uncover the operational portion of said saw blade in response to movement of said saw unit along a predetermined distance from said rest position, and for freeing said safety cover for movement independently of said saw unit upon movement of said saw unit beyond said predetermined distance from said rest position.

2. A power miter saw comprising:

a support base;

a mounting arm connected to said support base for swinging movement around a vertical axis;

a miter saw unit pivotally connected to said mounting arm and having a circular saw blade and a drive motor for driving said saw blade;

a blade case attached to said miter saw unit and adapted to partially encase said saw blade so as to provide an exposed operational portion of said saw blade;

a movable safety cover mounted on said blade case and adapted to cover said exposed operational portion of said saw blade; and actuating means disposed between said mounting arm and said safety cover, for directly associating said safety cover with the pivotal movement of said miter saw unit, said actuating means comprising:

a first engaging pin mounted on said safety cover;

a second engaging pin mounted on said mounting arm; and an actuating link pivotally supported on said blade case;

said actuating link having a first cam groove formed in one end thereof in generally opposed relation to said first engaging pin for moving said safety cover and having a second cam groove formed in the other end for controlling the pivotal movement thereof.

3. The power miter saw as defined in claim 1 wherein said actuating means comprises:

a first engaging pin mounted on said safety cover;

a second engaging pin mounted on said mounting arm; and an actuating link pivotally supported on said blade case;

said actuating link having a first cam groove formed in one end thereof in generally opposed relation to said first engaging pin for moving said safety cover and having a second cam groove formed in the other end in generally opposed elation to said second engaging pin for controlling the pivotal movement of the safety cover.

* * * * *